W. E. ELLIOTT.
TYPOGRAPHICAL COMPOSING AND DISTRIBUTING MACHINE.
APPLICATION FILED JULY 1, 1914.
1,270,275.
Patented June 25, 1918.
6 SHEETS—SHEET 4.
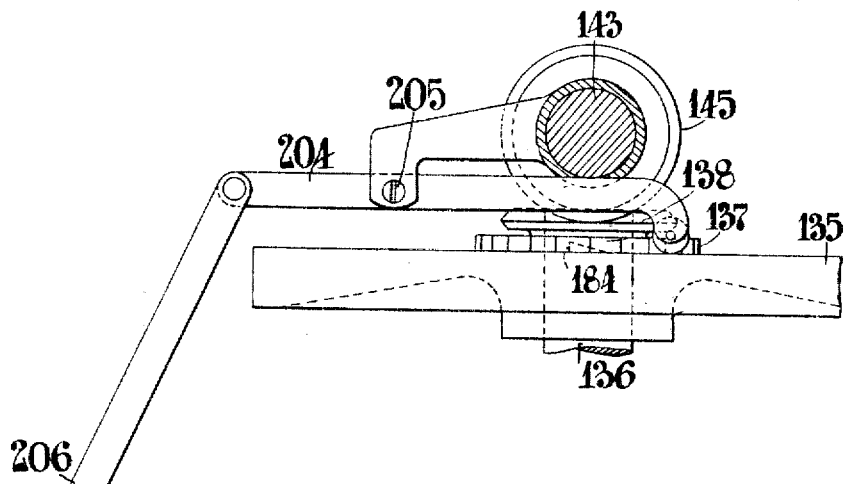
Fig. 8.
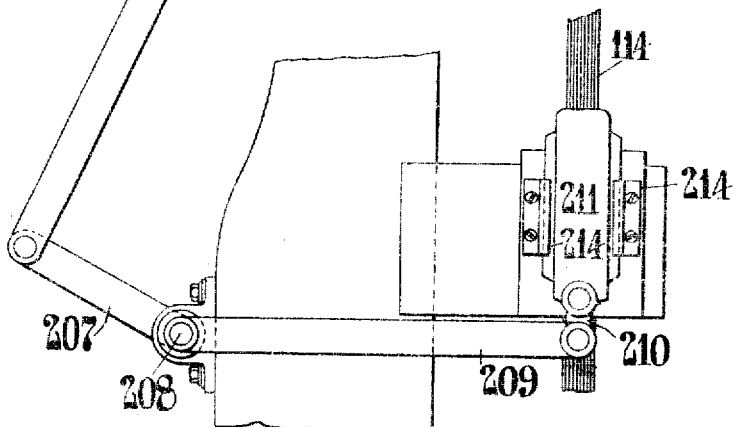

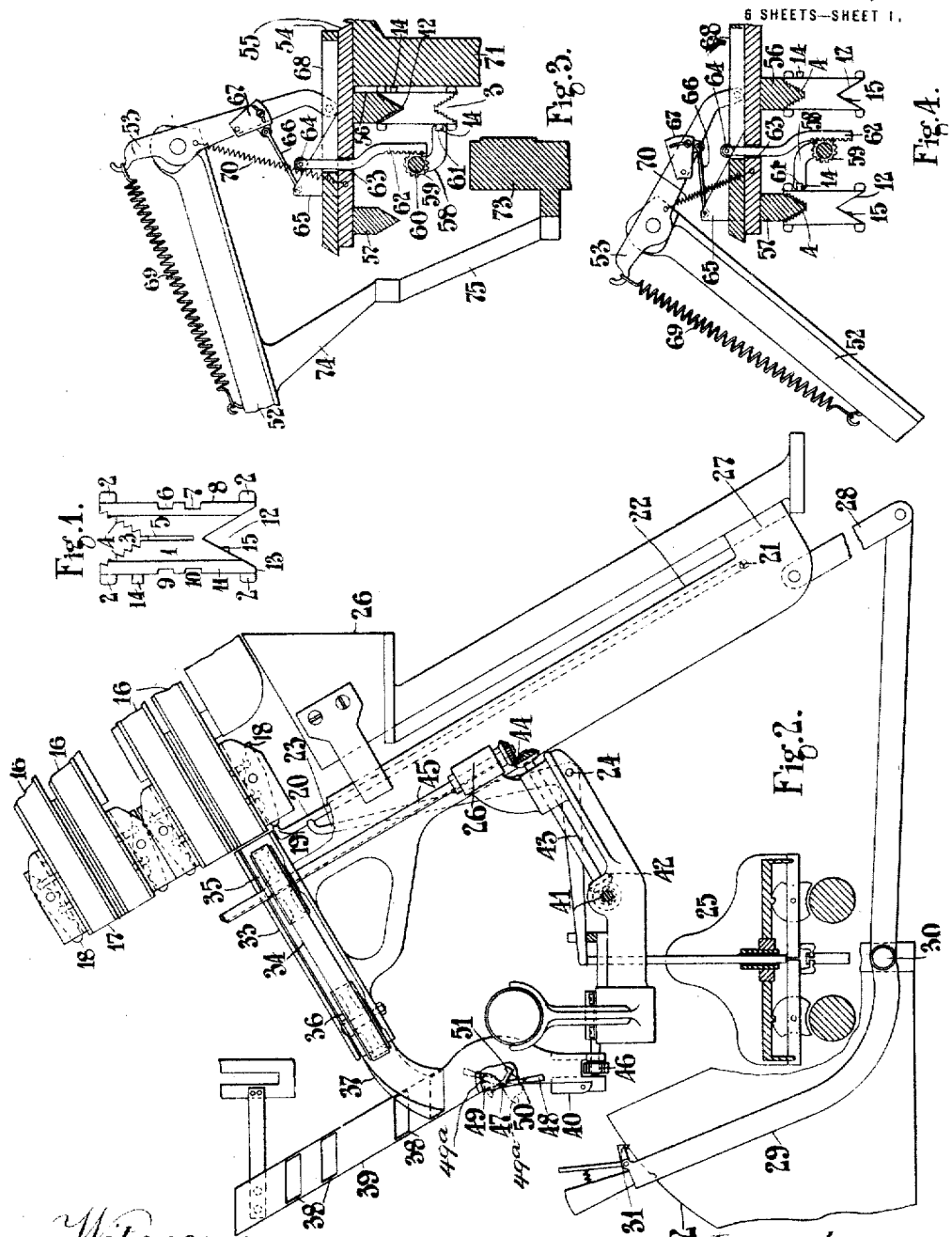

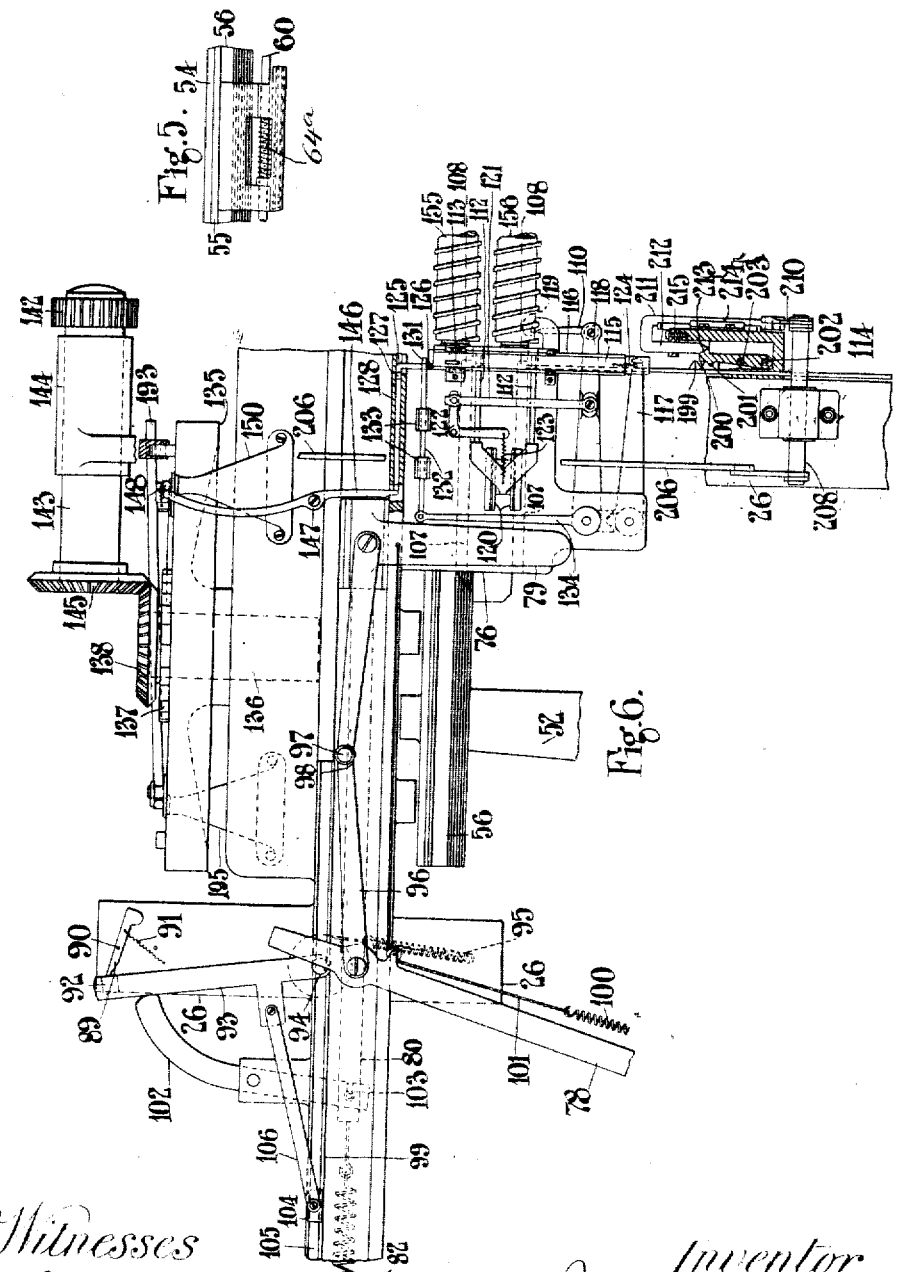

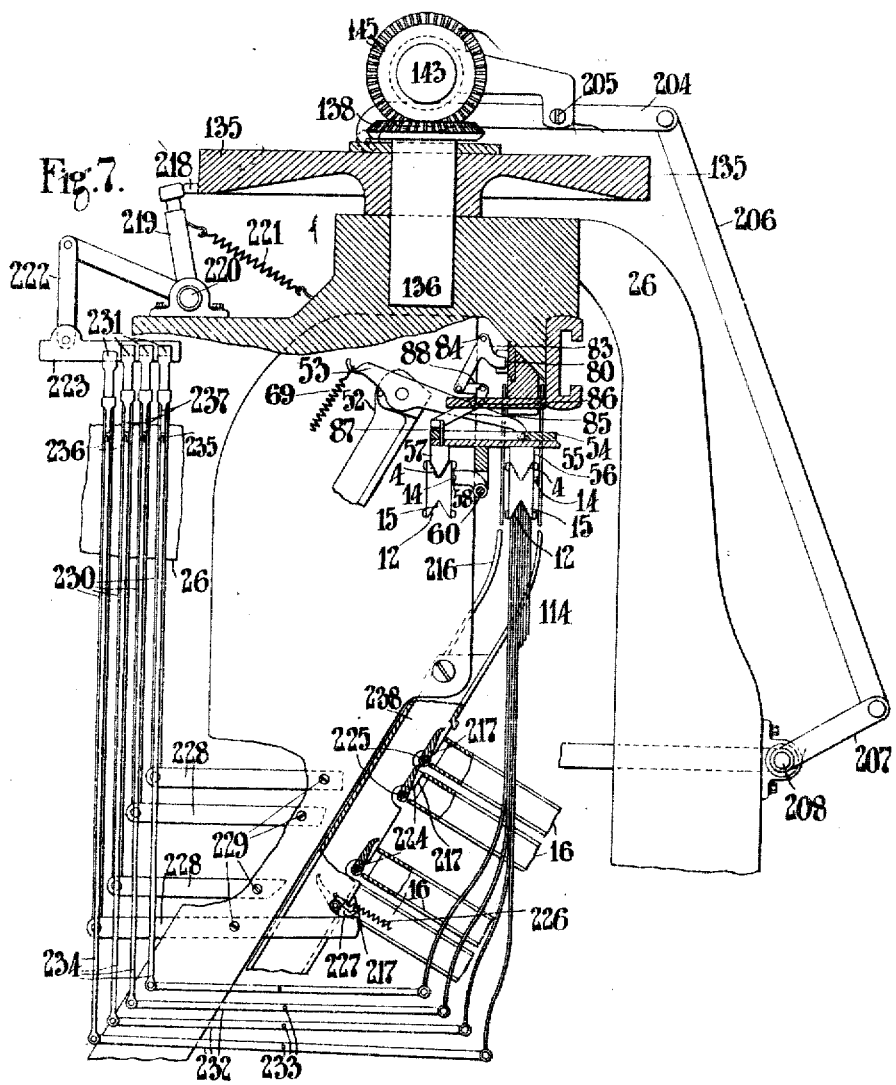

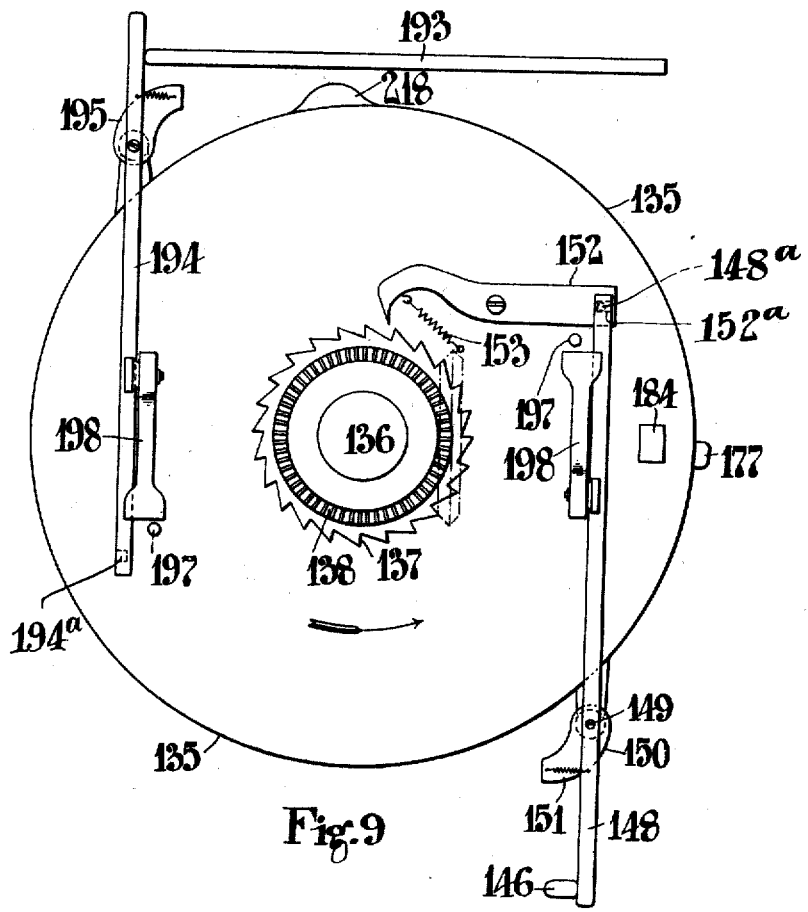

W. E. ELLIOTT.
TYPOGRAPHICAL COMPOSING AND DISTRIBUTING MACHINE.
APPLICATION FILED JULY 1, 1914.
1,270,275.
Patented June 25, 1918.
6 SHEETS—SHEET 6.
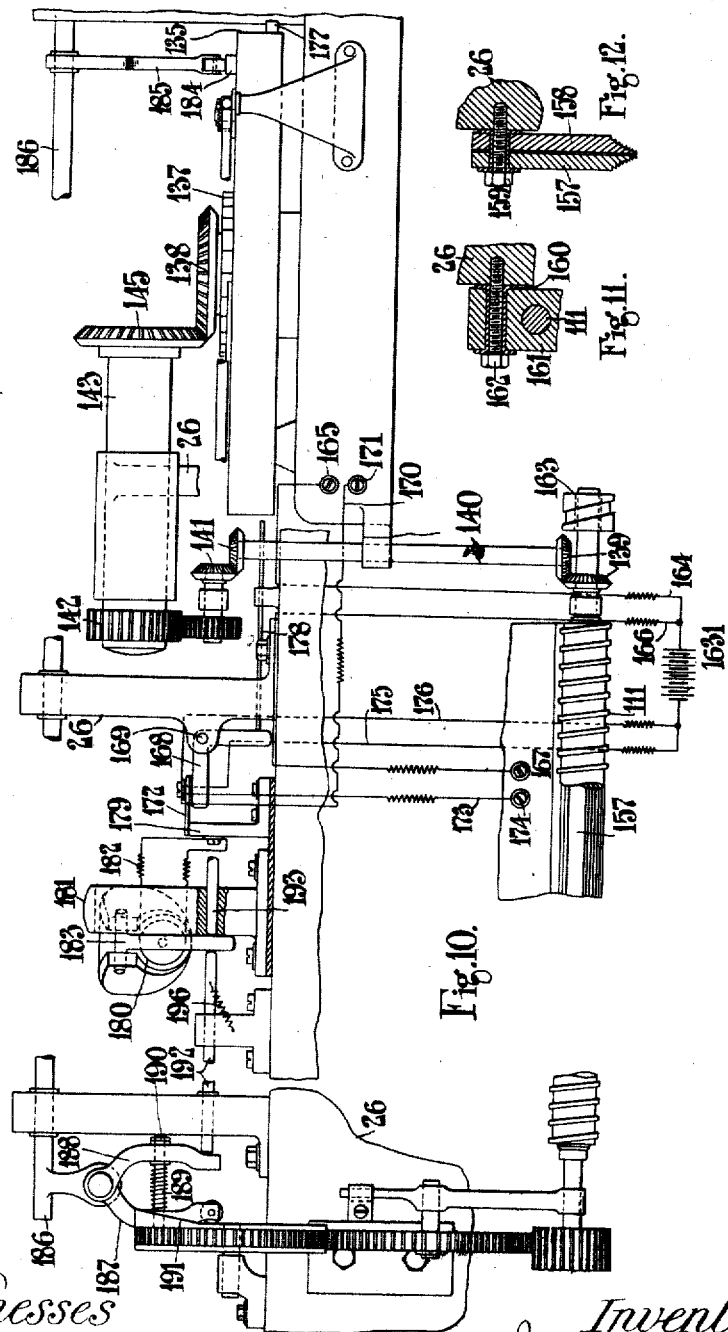

UNITED STATES PATENT OFFICE.

WILLIAM EBENEZER ELLIOTT, OF LIVERPOOL, ENGLAND, ASSIGNOR TO MERGENTHALER LINOTYPE COMPANY, A CORPORATION OF NEW YORK.

TYPOGRAPHICAL COMPOSING AND DISTRIBUTING MACHINE.

1,270,275.   Specification of Letters Patent.   Patented June 25, 1918.

Application filed July 1, 1914. Serial No. 848,347.

*To all whom it may concern:*

Be it known that I, WILLIAM EBENEZER ELLIOTT, a subject of the King of the United Kingdom of Great Britain and Ireland, residing at 133 Salisbury road, Wavertree, Liverpool, in the county of Lancaster, England, have invented new and useful Improvements in Typographical Composing and Distributing Machines, of which the following is a specification.

This invention relates to improvements in typographical composing and distributing machines, especially in those of the Mergenthaler type which are commercially known under the trade mark "Linotype", it being premised that the invention is not affected by the fact that the commercial machines use matrices (intaglio pieces) as distinguished from type dies (cameo pieces), so that throughout this specification and claims, the terms "matrix", "matrices" are to be respectively understood as including "type-die", "type-dies", as their mechanical equivalents.

The following features are known at the present time in machines of the class just particularized—a plurality of magazines served by a single stationary distributer and delivering to a relatively fixed assembler through a single assembler entrance; adjustability of the latter as a whole to make it register with any one of the magazines; and equipment of each of the magazines with matrices having two opposite character-bearing edges, a character on one edge standing on its head when the opposite character in the opposite edge is standing on its foot, whereby an inversion of each matrix during the process of composition, may be necessary to place the desired character the right way up in the composing plane, and which necessity would cause a second one, viz: that of reinversion before the said matrix reaches the distributer.

The present invention relates to improvements in machines of the said class and comprises beginning with the matrices and following them in their course through the machine.

(*a*) the addition to each matrix of a projection which shall indicate to the distributing mechanism the magazine to which it belongs:

(*b*) an assembler entrance and its guides, with escapement actuators and traveling assembler belt in the same plane as the magazines and together adjustable by the operator between the magazines and a stationary chute, to place a given magazine in matrix delivering connection with the relatively fixed assembler:

(*c*) means of improved form for keeping the said assembler belt regularly and constantly driven by the known driving means in spite of the changes in its position caused by the adjustment of the improved assembler entrance:

(*d*) an improved matrix-inverting device adapted to be engaged by the falling matrices and to invert them without injuring their matrix indicating projections.

(*e*) an improved device for re-inverting the matrices:

(*f*) means for shifting the re-inverted matrices into the distributer box after the normal matrices have been shifted thereinto:

(*g*) means for keeping at any one time the entrance mouths of all the magazines except one closed;

(*h*) means by which the fact of the leading matrix in the distributer box being of a different font from its immediate predecessor, stops presentation of matrices to the distributer until the entrance mouth of the magazine to which the said leading matrix belongs, has been opened and the entrance mouths of all the other magazines closed, and (*i*) various other means or devices which will be more fully described in the detailed description to follow.

The accompanying figures illustrate a preferred form of the application of the invention to a machine of the type particularized above. In them, Figure 1 is a side elevation of an improved matrix:

Fig. 2, a side elevation from the right hand side of a machine, of the column of magazines and adjustable escapement and assembling mechanisms:

Fig. 3, a detail sectional side elevation from the left side of the machine, of the second elevator head receiving a line composed of normal and inverted matrices in the intermediate space bar channel, the visible matrix being an inverted one:

Fig. 4, a similar elevation of the same elevator and head moving up to the distributer and showing the inverted matrices of the said line, in their reinverted position:

Fig. 5, a detail rear elevation;

Fig. 6, a front elevation of the line-shifter and distributer box;

Fig. 7, a sectional side elevation of the distributer, magazine entrances and part of the depressor lock, from the left side of the machine;

Fig. 8, a sectional side elevation from the right side of the machine of the depressor lock;

Fig. 9, a plan of a portion of Fig. 8;

Fig. 10, a rear elevation of the electric currents, the make and break, and their connections with the distributer; and Figs. 11 and 12, detail vertical sections from the left side of the machine.

*Matrices—Figs. 1, 3, 4 and 7.*—One of these matrices 1 is shown in side elevation and detached from the machine in Fig. 1. It has the usual Mergenthaler conformation so far as to have a lug 2 at each corner, a V-shaped distributing notch 3 and teeth 4 in its top end, a central groove 5 in one side face, two formative cavities 6, 7, for characters in its rear edge 8 and two formative cavities 9, 10, for characters in its front edge 11. The presence of formative characters in both edges obviously, and has always, required that each matrix 1 should be inverted in its own plane to bring its front edge into the composing plane, and should have a V-shaped notch 12 with plain edges in its foot 13, to embrace, without engaging with, a certain ridged V-shaped bar which the notch 3 was called on to embrace and its teeth 4 to engage with. By "rear edge" is meant the one which a non-inverted matrix will present to the mold or equivalent organ of the machine, and vice versa. For the purpose of the present invention, each matrix has a dovetail lug 14 projecting from its front edge 11 near the top lug 2 thereon, and a magazine-indicating tooth 15 projecting from one plain edge of the notch 12. All the matrices for machines constructed according to the said preferred form, have the lugs 14 in the same position, and all the matrices of one font have their teeth 15 in the same position, which latter is different for each font. The function of a tooth 15 is to indicate to the distributing mechanism, the particular magazine of the plurality of magazines to which the matrix bearing it belongs. Consequently, such a tooth may, functionally, be replaced by a notch, the immediately coöperating organ of the machine being modified accordingly.

*Magazines—Figs. 2 and 7.*—There may be any convenient number of magazines 16 in the plurality, and they are arranged obliquely and in a stationary column between the known single assembling mechanism in front of it and the known single stationary distributer behind it. A leading matrix is released to drop through the delivery mouth 17 of the respective magazine, by any suitable type of escapement 18 which presents its nose in the plane of the mouths 17 and is worked by the rearward motion of a hammer 19. The shaft 20 of each hammer 19 must be as long as the height of a column of magazines 16. All these shafts 20 are pivoted by their bottom ends on one and the same axis 21 in the known way, but this axis is now in a frame 22 capable of being raised and lowered in a direction parallel with the plane of the magazine mouths 17, to make the row of hammers 19 register with the row of escapements 18 of the particular magazine from which it is desired to compose. Each hammer 19 is moved to the rear by the usual bell crank lever 23 working on a stationary fulcrum 24 and worked from the machine keyboard through the known mechanism 25. The frame 22 is capable of being raised and lowered for the purpose stated, by being connected to the machine frame 26 by a dovetail mortise and tenon device 27, and is so raised and lowered by any suitable means under the control of the operator, such as a link 28 from it to a hand lever 29 fulcrumed at 30 near the keyboard and coöperating by a detent 31 with a notched quadrant 32.

*Assembler—Fig. 2.*—There is only a single assembler entrance 33 and this with the usual guides, belt 34, the pulleys 35, 36, of the latter, and a delivery chute 37, are fixed as a whole upon the top of the frame 22 in a plane of the same obliquity as that of the column of magazines 16, but at such a distance from the row of hammers 19 that when the latter register with the row of escapements 18 of any particular magazine, the assembler entrance 33 is in register with that magazine and the above-mentioned chute 37 with one of a series of ports 38 in a chute 39 stationary between the chute 37 and the entrance to the usual horizontal and relatively fixed assembler 40 which receives the line as it is composed. There are as many ports 38 in the chute 39 as there are magazines 16 in a column. To compensate for the rising and falling motion of the assembler entrance 33 and for the change in its plane from vertical to oblique, the driving pulley 35 of the belt 34, is driven from the known assembler shaft 41 through gears 42, a shaft 43, gears 44 and a shaft 45 of a length proportioned to that of the movement of the frame 22, and mounted, with its axis parallel with that movement, to turn in the machine frame 26, the connection between it and the pulley 35 being by means of a spline device indicated by the dotted lines, as distinguished from a key or set-screw. This arrangement provides for all the matrices released from the column of magazines 16, being delivered into the shoot 39 in regular succession. As they issue from the latter, they are forced into the assembler 40 by the known and so-called assembler star-wheel 46. When inversion of any or all of the matrices, is necessary, it is effected at a point between a magazine mouth 17 and the wheel 46, by any suitable device such as the known one illustrated. This consists of a rocking shaft 47, extending across the front of the chute 39 within convenient reach of the operator, an external hand lever 48 for turning it, two bars 49, 50, fast to the shaft 47, the former of, approximately, segmental form in cross section, and the latter flat and when in its operative position, forming a shelf terminating preferably in a ledge 51. So long as no inversion is required, the lever 48 stands in the dotted line position, thereby holding the two bars 49, 50 out of action, but as soon as the last of the matrices required to present their rear edges in the composing plane, has passed the device, the position of the latter is reversed, whereupon the notch 12 of the next matrix, engages on the bar 49 which turns it in its own plane, till the bottom lug 2 on the edge 8 engages with the ledge 51, which engagement completes the inversion. The first face of the bar 49 to be engaged by the notches 12, is cut away as at 49ᵃ to make room for the teeth 15. The foregoing matrix inverting device is clearly shown and described in my previous Letters Patent No. 973,181, to which reference may be had if desired. My present improvement merely consists in the provision of the notch 49ᵃ in the outer edge of the bar 49 to avoid striking the teeth 15 on the matrices as the latter are engaged by the bar in effecting their inversion.

*Between assembler 40 and distribution.*—The organs of the machine from the assembler 40 onward throughout the path through which the matrices travel, have, so far as may be necessary, special grooves or their equivalents to make room for the lugs 14 on the matrices. When the latter have the known plurality of formative cavities in an edge, as shown in Fig. 1, the machine is equipped with one of the known devices for putting the desired cavity in the composing line in the assembler 40. This putting necessarily makes the matrices in a composed line stand at different levels. They are, subsequently to their having been used at the mold or its equivalent, and before they are presented to the organ known as the second elevator, restored by any of the known means, to the normal level.

The constructional features next described and their movements (which latter are automatic), are the same whether all the matrices of the composed line are normal, *i. e.*, not inverted; or inverted; or some of them normal and the remainder inverted. For the sake of conciseness, let it be assumed that the line consists of matrices in both positions.

*Re-inversion of inverted matrices—Figs. 3, 4, 5 and 7.*—The head of the known second elevator 52 is pivoted on the so-called matrix carrier bar lever 53 in the usual way, but consists, according to the present invention, of two matrix carrier bar plates 54, 55, instead of only one as hitherto. The top one 54 of these two plates is pivoted to the lever 53, and the bottom one 55 is connected to the top one 54 in such a way that it can be slit across it from front to rear, and vice versa. Any suitable type of connection may be adopted, *e. g.*, a transverse mortise and tenon near each end of the head. The plate 55 carries the usual V-shaped and ridged matrix carrier bar 56 and a second one 57 of the same length and V-shape to the rear of and parallel with it but without ridges on its sloping sides. The distance separating the bar 57 from the bar 56 is according to the width of a matrix and the room necessary for the presence and action of the matrix re-inverting bar 58 and its pinion 59. These three bars are necessarily as long as the longest composed line. The bar 58 is fast by one edge and which shows as the rear one in Fig. 3, to a shaft 60 journaled in lugs (not shown) depending from the bottom plate 55 and has a dovetail groove 61 in its outer end. 62 is a rack in constant engagement with the pinion 59 and capable of a vertical reciprocating motion to work the bar 58, through a guide slot 63 in the plate 55. The top end of the rack 62 is continued through the plate 54 and carries a roller 64 which is kept in constant engagement, by a torsion spring 64ᵃ—Fig. 5—arranged about the shaft 60 and having its ends fast to the latter and one of the above mentioned dependent bearings, respectively, with a cam 65 arranged to slide forwardly and backwardly in a slot 68 of the plate 54, and inclined toward the lever 53 and downward toward the said plate. The tendency of the torsion spring 64ᵃ is not only to draw the rack 62 downward but to keep the bar 58 presenting its groove 61 to the rear, as shown in Fig. 4. The cam 65 is linked to the lever 53 by a link 66 and an adjusting device 67. The improved head 54, 55, is connected with the elevator 52 substantially as heretofore, *i. e.*, by the pivot already referred to and by a spring 69 pulling on its rear from a fixed point lower down the elevator 52 and a second spring 70 pulling on the rear of the head 54, 55, from a fixed point on a lever 53. As the elevator 52 is moving downward from the distributer which is at the top of the machine frame 26, toward the intermediate space bar channel 71, the internal angle between the bottom edge of the elevator 52 and the rear edge of the lever 53 remains constant, but is made more acute by the act of the elevator 52 seating its head upon the top of the said channel 71 and its bar 56 within it, the change in angle moving the bottom end of the lever 53 a little to the rear, as heretofore. This rearward motion of the lever 53 causes the link 66 to assume a more inclined or nearly vertical position, and consequently shifts the cam 65 forwardly with reference to the plate 54 thereby raising the rack 62 and rotating the bar 58 to the front against the tension of its spring 64ª to locate the groove 61 in the path of the lugs 14 on the inverted matrices (see Fig. 3). The improved head is now in position to receive the composed line of normal and inverted matrices, the former engaging the bar 56 by their teeth 4 as heretofore, and the latter loosely embracing the said bar by their notches 12 and engaging with the bar 58 by having their lugs 14 pushed into the groove 61 therein. As the elevator 52 rises toward the distributer, the lever 53, elevator head 54, 55, and cam 65 are returned to their original positions by the springs 69 and 70, and the groove 61 to its original position by the torsion spring 64ª, whereby the inverted matrices on the bar 58 are re-inverted and held with their teeth 4 touching but not engaging with the sides of the bar 57, as shown in Fig. 4. The rear side 73 of the channel 71, may be if desired so arranged (as, for instance, in suitable vertical guideways) with reference to the frame 26 of the machine and the second elevator 52, that a finger 74 on the latter can engage with an extension 75 thereon and depress it, as the elevator head 54, 55, approaches the said channel—Fig. 3—so as to make room for the bar 57 and the re-inversion of the inverted matrices, and the side 73 automatically by a spring or otherwise returned as the elevator 52 rises toward the distributer. Or if preferred, the side members 73 may be cut away to make room for the parts.

*Distributer shifter—Figs. 6 and 7.* The rise of the elevator 52 presents the normal matrices—those hanging from the bar 56—to the known distributer box 76, and they are pushed into the latter by the known distributer shifter, as heretofore. After that has been effected, the rear bar 57 must be alined with the distributer box 76 (for obviously if the bar 56 is alined with the said box, the bar 57 must be then standing to the rear of the alining position) and the shifter be retracted and made to act a second time. This is done by the following means acting as described. It will be remembered that the known distributer shifter consists of a vertically mounted lever 78 urged in one direction by a cam and in the other by a spring (neither of which is included in the figures) once for each reciprocation of the elevator 52, a shifter head 79 that does the actual pushing of the matrices into the distributer box 76, and a link connecting the said head 79 to the lever 78, the link being horizontal and the head 79 moving horizontally. The present invention adds to the foregoing combination—a bar 80 adapted to slide in a horizontal guide fixed across the machine frame 26 near its top, and having a cam slot longitudinally arranged in it. This bar 80 is pulled to the left, looking at Fig. 6, as soon as it has been released, in the way described further on, by a spring 82 pulling on it from a fixed point on the machine frame 26, so as to pull the bottom plate 55 of the elevator head far enough to the front against the pull of the respective returning springs to so aline the rear matrix carrier bar 57 with the distributer box 76, the bar 80 being connected with the bottom plate 55, which carries the carrier bar 57, by a lever 83 (see Fig. 7) fulcrumed at 84 on the machine frame 26 with its front arm engaged in the cam slot of the bar 80, a second lever 85 fulcrumed at 86 on the said frame 26 and engaging behind a projection 87 from the plate 55 and a link 88 from the lever 83 to the lever 85. The bar 80 is locked against the pull of its spring 82 by a detent 89 pivoted at 90 on the frame 26 and held normally by a spring 91 up to a lug 92 which, with the said spring, holds it in detaining engagement with an arm 93 pivoted at 94 on the frame 26, against the pull of a spring 95 pulling from a fixed point on that frame. The hitherto unbending link 96, has a front-to-rear knuckle joint 97 about midway of its ends, which joint carries a roller 98 axially alined with it. This link is kept rigid while the normal matrices are being shifted by the shifter head 79 into the distributer box 76, by the roller 98 being kept in engagement with the underside of a guide 99 fast on the frame 26, as by a spring 100 and cord 101 pulling on the said head 79 from a fixed point on the shifter lever 78. The guide 99 is so proportioned and positioned that at the moment when the head 79 completes the above-mentioned shifting, the roller 98 then being moved to the right—looking at Fig. 6—leaves it, whereupon the link 96 is bent smartly upward by the pull of the spring 100, being thereby made to contact with the detent 89 and rock it out of detaining engagement with the arm 93 which is forthwith brought smartly down by the spring 95 upon the knuckle joint 97, thereby straightening the link 96. But before this straightening is completed, a lever 102 fulcrumed on the frame 26 and loosely connected as by a stud-and-slot device 103 with the bar 80, had been, under the pull of the spring 82, held in contact with the arm 93, thereby locking the said bar and the arm 93 also, and is now freed by the above-mentioned downward motion of the said arm, thereby unlocking the cam bar 80 which is forthwith made by the spring 82; and acting through the combination 83, 85, 87 and 88 already described, to simultaneously move the bar 56 to the front out of alining position and to aline the bar 57 and the re-inverted matrices on the bar 58, with the distributer box 76. The contour of the cam above mentioned as rocking the shifter lever 78 in one direction, is so modified as to keep the said lever stationary during the above-mentioned bending and straightening of the shifter link 96. And as the lever 78 is so stationary, the straightening of the link 96 makes the shifter head 79 make a second shifting motion, thereby shifting the last mentioned matrices into the distributer box 76. The shifter lever 78 is then returned to its original position, and during that return its top end engages a block 104 sliding in a groove 105 in the guide 99 and connected by a link 106 with the arm 93, thereby returning the arm 93, lever 102, cam bar 80, and plate 55, to their original positions, and locking the said arm, lever, and cam bar therein, by the reëngagement of the detent 89 with the arm 93.

*Preventing distribution to the wrong magazine and selecting the right one—Figs. 6 to 12.*—The matrices engage by their four lugs 2 in as many grooves 107 in the sides of the distributer box 76. 108 is a right angled drop in each groove 107, the drop in a top groove being vertically over the one in the bottom groove, and each leading matrix must be forced by the depressor described in detail farther on, down those drops, before it can move forward to the known matrix lifter 110 at the exit end of the distributer box 76, and which lifter lifts each leading matrix successively into engagement with the traversing screws of the distributer as heretofore. The push exerted by the shifter head 79 might suffice to press a leading matrix against the vertical faces of the drops 108 hard enough to prevent it dropping, but to insure that it does not drop prematurely, it is supported by any suitable reciprocating device such as a prolongation of or projection from a bifurcated matrix pusher 112 described farther on. 113 is the matrix depressor. It is arranged immediately over the drops 108 and therefore immediately over the position occupied by a leading matrix, and under them there is a series of vertical blades 114 in the plane of that position. There are as many of these blades 114 as there are fonts of matrices or, in other words, as there are magazines on the machine, and the tops of them coöperate with the magazine indicating teeth 15 on the respective fonts of matrices. The function of the depressor 113 is to act as a font-separator by depressing a leading matrix, and that of the series of blades 114 is to coöperate therein by holding back any matrix belonging to a magazine other than the one to which its immediate predecessor belongs, until the latter has been duly distributed thereinto. Consequently, the blades 114 are, by themselves, magazine-selecting blades. The depressor 113 is reciprocated vertically by any suitable means, such as by being carried by a slide 115 working in suitable guides 116 on the distributer box 76 and having its bottom end connected to the nose of a lever 117 engaged with and reciprocated by the usual vibrating lever 118 that works the matrix lifter 110. It may be stated at this point, that a depression of the depressor 113, forces a leading matrix, hitherto supported by suitable prolongations of or projections from the above-mentioned pusher 112, but which are withdrawn to allow of such depression, down the stops 108, whereupon the return motion of the pusher 112 pushes the said matrix up to the usual shoulders 119 where it is in the path of the lifter 110. This pusher 112 works in suitable guides 120 on the distributer box 76 and is reciprocated from the lever 118 by a link 121 connecting the latter to one arm of a bell crank lever 122 fulcrumed on the said box 76 and having its other arm connected to the pusher itself, by an intermediate cushioning spring 123.

A line of matrices in the distributer box 76 and of the same font, therefore belonging to the same magazine, presents, looking at their feet from either side of the machine, an inverted V-shaped arch modified by the projection into the archway, of a tooth as long as the line, that tooth being the row of magazine selecting teeth 15, and the tops of the series of blades 114 present the appearance of an inverted V having stepped edges, each step being the top of one blade. All the blades 114 are automatically held locked by the means described farther on, when they are in position for letting a leading matrix pass—see Fig. 7—and under no circumstances do they remain unlocked for longer than the term of one depression of the depressor 113. Thus a leading matrix in the distributing box 76, can be depressed only when the series of blades 114 is locked in the position agreeing with the tooth 15 on that matrix. If it does not agree, the matrix cannot be depressed until all the preceding matrices of a different font and, therefore, belonging to a different magazine, have been duly distributed. If they have been so distributed, the blades will be automatically unlocked. Now as the reciprocation of the depressor 113 is continuous and a leading matrix perhaps blocked by the blades, there is a yielding device such as a spring 124 between the slide 115 and its lever 117. Such blocking always takes place when the leading matrix belongs to a magazine other than the one indicated by the locked position of the series of blades 114, and into which magazine, the immediately preceding matrix (and perhaps matrices) are being distributed, so that until this last mentioned distribution is completed, the said matrix under the depressor 113, must stay where it is. When this state of things obtains, the machine automatically indicates the completion of that distribution. This indication is made by, preferably, the following means. 125 is a tappet bent to a right angle, pivoted at 126 upon the top of the depressor slide 115, and also so proportioned that the weight of its horizontal arm, by resting on the flat top of that slide 115, keeps the tappet nose of its vertical arm in contact with the forwardly bent end 127 of a push rod 128 sliding in a guide in the frame 26, and the said arm in the path of the hooked end 131 of a rod 132 reciprocated in guides 133 on the distributer box 76, by an arm 134 whose top end is pivotally connected to the opposite end of the said rod 132 and its bottom end fast to the matrix lifter lever 118 so as to rock about the same axis. 135 is a disk acting as a magazine changing clutch disk. It is mounted to turn about an upright shaft 136 fast on the machine frame 26. 137—Fig. 9—is a ratchet wheel likewise loose on the shaft 136 just above the disk 135 and fast to a miter gear 138 which is driven from the rear traversing screw 111—Fig. 10—through miter gears 139, a vertical shaft 140 turning in the machine frame 26, a second pair of miter gears 141, a pair of spur gears 142, a shaft 143 turning in a bearing supported by the frame 26 and a miter gear 145. Consequently the ratchet wheel 137 is constantly rotating because the distributer screw 111 is. The connection between the push rod 128 and the disk 135 consists—Figs. 6 and 9—of a vertical lever 146 fulcrumed at 147 on the frame 26, having its bottom end kept always in contact with the adjacent end of the said rod 128 and its top end in contact with a lever 148 fulcrumed at 149 on a bracket 150 fast to the machine frame 26, by a spring 151 pulling on the said lever 148 from the bracket 150 a pawl 152 pivoted on the disk 135 and held out of engagement with the ratchet wheel 137 by the engagement of an upstanding pin 152$^a$ of its adjacent end with an open recess 148$^a$ formed in the opposite end of the lever 148; and a spring 153 adapted, by pulling on the opposite end or nose of the pawl 152 from a relatively fixed point on the disk 135, to engage it with the ratchet wheel 137. Consequently, a block of the depressor 113 which means the presence under it of a matrix of a different font and which calls for a change of magazine, starts the disk 135 rotating in the direction indicated by the arrow in Fig. 9, due to the actuation of the push rod 128 by the tappet 125 on the depressor slide 115 which is held against downward movement by the presented matrix.

As long as the disk 135 is at rest, a cam on it holds open, an electrical make-and-break—Fig. 10—fixed on the machine frame 26 but insulated from it. Both cam and make-and-break are described at length farther on. The presence of an electrical factor in the invention necessitates certain insulations. Thus, as the distributer must be in the electrical circuit, the whole of it is insulated from the machine frame 26 at the points of connection to and with the latter. As the second elevator 52 brushes a part of the distributer when it is presenting the composed line of matrices in its head to the distributer box 76, the lever 53 and its spring 69 are both insulated from the arm of the elevator 52. A further insulation is necessary between the shifter lever 78 on the one hand and the machine frame 26 and the cam and spring that work that lever, on the other. The distributer consists, functionally, as heretofore of a central distributing bar along which the matrices are traversed by two traversing screws 155, 156—Fig. 6—in front of it and one traversing screw 111 behind it. The distributing bar is now divided longitudinally and vertically—Fig. 12—into two equal halves 157, 158, which are insulated from each other and also from the frame 26 and the screws 159 which hold them thereto. The rear traversing screw 111 is insulated—Fig. 11—from the two front ones 155, 156, such insulation being effected by the presence of an insulation 160 between each screw-bearing bracket 161, each holding screw 162, and the frame 26. The cam 163 by which the shaft of the screw 111 vibrates the matrix-lifting lever 118, is insulated from that shaft. And as the opposite end of the same shaft now carries certain gears—Fig. 10, that end is insulated from them, as by the first gear being of non-electric material such as hide. 1631 is the battery for the distributer circuit. The wiring of the latter is as follows: The positive conductor has two bifurcations—one 164 led to the binding screw 165 to the rear traversing screw 111, and the other 166, through the binding screw 167 to the rear half 157 of the distributer bar. 168 is the make-and-break which is pivoted at 169 on the frame 26. 170 is a wire from the binding screw 171 being therefore a continuation of the wire 164, to a plate 172 on the make-and-break 168 but insulated therefrom; and 173 is a like continuation of the wire 166 but from the binding screw 174 to the same plate 172, whence the respective return wires 175 and 176, being bifurcations of the negative conductor are led to the battery 1631, the return half of the circuit being through binding screws similar to screws 171, 174, but located on the bearing of the front traversing screws 155, 156, and the front half 158 of the distributer bar. It is now obvious that the distributer circuit, i. e. the one from the battery 1631 through the plate 172, can be closed only by connecting the front screws 155, 156, and the rear screw 111 together, and the two halves 157, 158 of the distributer together likewise. This closure is effected by any matrix then being traversed along the distributer bar, say the one that immediately preceded the new one now blocking the depressor 113, and which is, therefore, of a different font from that blocking one and so belongs to a different magazine.

The clutch disk 135, in addition to changing the magazines, controls a supplementary electrical circuit and through it, its own rotation. For these additional purposes, the following organs are provided. 177 is a cam projecting from or beyond the periphery of the said clutch disk and pressing during its term of rest upon a push rod 178—Fig. 10—working in the machine frame 26 and having its opposite end constantly bearing against the depending arm of the make-and-break 168, so as to make that rod hold the plate 172 up and off an intermediate conductor 179 fixed on the frame 26 and insulated from it. 180 is an electro-magnet in the above-mentioned supplementary circuit 182 and supported by a standard 181 fast on the said frame 26 but insulated from it. The terminals of this circuit 182 are in the conductor 179. The above described wiring of the distributer circuit to and from the plate 172, and the construction of the latter are so arranged that the raising of the plate 172 up off the conductor 179 does not open that circuit, while the dropping of the said plate upon the said conductor makes the circuit 182 a continuation of the distributer circuit. 183 is the armature of the magnet 180. 184 is a cam on the disk 135, adapted to engage once in each rotation of that disk, with an arm 185 fast to and depending from a shaft 186 journaled in the frame 26 across it, and having pivoted on its opposite end, two depending arms 187, 188, pushed apart by a helical spring 189 the resilience of which is adjustable by a rod-and-nut device 190. The pair of arms 187, 188, rocks in the plane of the axis of their shaft 186. 191 is a cam fast on the last member of the train of gears above referred to as being driven by the shaft of the traversing screw 111, and is so positioned as to rock the said pair of arms away from it once during each of its rotations. 192 is a push rod extending from the said pair of arms up to the path of the armature 183 and working in the frame 26, and 193 is a second push rod alined with the rod 192 and likewise working in the frame 26. It extends from the other side of the said path up to a replica 194—Fig. 9—of the lever 148 and its addenda but positioned on the opposite side of the clutch disk 135. This replica is pivoted upon a bracket 195—Fig. 6—fast to the machine frame 26 in the same way as the lever 148 on its bracket 150. 196 is a spring to return the push rod 192 after the cam 191 has freed it. It is strong enough to effect such return but not strong enough to affect the spring 189. The alined rods 192, 193, are parallel with the shaft 186. It has been explained that the distributer circuit is now held closed by the preceding matrix on it, that the clutch disk 135 is rotating, and that the magnet 180 is energized. Up to the time that the latter was energized, the weight of its armature 183 kept the latter swung out of the space between the rods 192 and 193, but the attraction by the magnet, pulls the armature into that space, so that any movement of the rod 192 toward the armature strikes the latter only and fails to reach the rod 193. The disk 135 is stopped at the end of the first half rotation by the engagement of the upstanding pin 152ᵃ of the pawl 152 with an open recess 194ᵃ formed in the outer end of the lever 194. But the drop of the said matrix from the distributer bar, opens the distributer and supplementary circuits and the armature 183 rocks out of the said space, whereupon the push rod 192 actuates the push rod 193 which, due to its direct engagement with the lever 194 (see Fig. 9) rocks the latter about its pivot to disengage it from the pawl 152. The disk 135 then completes its rotation, and the lever 148 freed from the control of the lever, 146 by reason of the depressor 113 being now unblocked, the blocking matrix having been sent forward to the matrix lifter 110, disengages the pawl 152 again, thereby stopping the disk 135, the latter remaining at rest until the next action of the lever 146. Any tendency on the part of the disk 135 to rebound when either lever 194 or 148 engages with the pawl 152, is prevented by the engagement of a cam-topped stud 197 on the said disk, with a gravity pawl 198 on each lever.

It has been explained that all the blades 114 had been automatically locked in the position that had allowed the matrix since referred to as the preceding one, to pass. Such a position and passing are shown in Fig. 7. This locking was effected by the following means: Each blade 114 has—Fig. 6—a block 199 upon it to carry two notches 200, one above the other, at a distance apart equal to the vertical movement of a blade. 201 is a locking tooth opposite the row of blocks 199, pivoted on the frame 26 at 202 and held away from the said row by a spring 203. 204—Figs. 7 and 8—is a lever fulcrumed at 205, i. e., practically on the frame 26 over the disk 135 and in such a way that its outer end will be raised once during each rotation of the said disk 135 by the cam 184 on the latter. The contour of th cam—Fig. 8—raises the said end quickly but drops it more quickly still—suddenly in fact. The opposite end of the lever 204 is linked by a link 206 to an arm 207 having its opposite end fast to a shaft 208 journaled in the frame 26 and having fast to it an arm 209 the opposite end of which is connected by a link 210 to a slide 211 carrying a depending finger 212 adapted to engage a bevel 213 integral with the tooth 201, both slide 211 and finger 212 working vertically in respective guides 214, 215, fast on the said frame 26. As soon as the clutch 135 starts on its second half rotation, the cam 184 raises the outer end of the lever 204, thereby allowing the spring 203 to disengage the tooth 201 from the row of blades 114 and so unlock them. These blades remain unlocked during the engagement of the cam 184 with the lever 204, such unlocking unblocking the depressor 113 and allowing it to depress the matrix under it, heretofore referred to as the blocking matrix, the contour of whose V-notch rearranges the row of blades 114 in view of its eventual distribution. The unlocking of the row of blades 114 is immediately followed by a smart relocking of them in their rearranged position, due to the sudden drop of the cam-engaged end of the lever 204, upon the clutch 135 at the moment of that cam's clearing the said end. As there are two notches 200 in each blade-block 199, it is obvious that the row of blocks will always present a row of notches to the locking tooth 201, no matter what arrangement has been imposed upon the row of blades 114.

216—Fig. 7—is the usual fixed magazine entrance standing under the distributer and leading to the several entrance mouths 217 of the plurality of magazines 16. All these mouths 217 are kept closed excepting one, the excepted one being that of the magazine to which the matrix heretofore referred to as the preceding one and as being on the distributer bar, belongs, and that excepted one had been, previously to the engagement of the matrix just mentioned with the depressor 113, standing closed but had been opened by the depression of the said matrix, through the effect of its tooth 15 upon the respective blade 114. The means by which the entrance mouth of the magazine to which the said matrix belongs, is opened and all the others closed are as follows: 218 is a cam projecting beyond the periphery of the clutch disk 135 and adapted to engage with and rock a bell-crank lever 219 fulcrumed at 220 on the frame 26, outward, against the pull of a spring 221. 222 is a link having rigidly connected thereto a bar 223 from the outer end of the lever 219. 224 is a magazine entrance mouth shutter. There is one for each mouth 217. A shutter 224 is fulcrumed along its bottom rear edge as at 225, and has a closing spring 226 pulling on it from a fixed point on the respective magazine and a, preferably curved, tail 227 held by the pull of the spring 226 down upon the adjacent end of a lever 228 fulcrumed at 229 on the frame 26, and having its opposite end pivotally connected with the bottom end of an upstanding rod 230 having a forked top 231. 232, 232, are levers fulcrumed at 233 on the frame 26 to establish a connection between the blades 114 and the respective closers 224. There are as many levers 232 as there are blades 114, and the foot of each blade 114 is continued downward and connected, preferably with a slight degree of looseness and flexibility, with the respective lever 232. 234 is an upstanding rod pivotally connected by its bottom end to the rear end of each lever 232 and having its top end pivotally connected to the outer end of the horizontal arm 235 of a bell crank lever fulcrumed on the frame 26 at 236 and having its vertical arm 237 forked to embrace the respective rod 230. As long as the disk 135 is at rest, the bar 223 is held by the cam 218 against the pull of the spring 221, engaged in that fork 231 which is connected with the shutter 224 then standing open, and which fork has been rocked forward by the depression of the connected blade 114. This shutter was held open by the engagement of the bar 223 in the said fork 231 holding the front end of the connected lever 228 and therefore the tail 227 of that closer, both raised. The rotation of the disk 135 disengages the cam 218 from the lever 219 whereupon the spring 221 raises the bar 223 out of the engaged fork 231 and the opened shutter 224 is shut by its spring 226, the pull of the latter returning the connected rods 230 and 234 and levers 228 and 235, 237. Then follows the depression of the matrix heretofore referred to as the preceding one and as one being on the distributer bar. It is true that the course of this matrix had been followed up to its leaving the distributer bar and which leaving is practically identical with entering its magazine, but this was necessary to account for the opening of the distributer and supplementary circuits. The said depression makes the tooth 15 on the said matrix, depress the coöperating blade 114 and through the connected lever 232, rod 234, lever 235, 237, rock the connected rod 230 into the path of the bar 223 in time for the cam 218 being now rotated toward the latter, to make the said bar 223 engage in the fork 231 of the said rod 230 and depress it, thereby making the front end of the connected lever 228 open the connected shutter 224 by the engagement of its front end with the respective tail 227. The said shutter is that of the magazine to which the said matrix belongs and the latter finds it open when having dropped from the distributer bar, it drops down the magazine entrance 216. Each shutter is slotted to clear the usual dividing plates 238 standing in the said entrance 216 and dividing into as many channels as there are matrix channels in a magazine. Such guides and stops as may be necessary for the above described motion of the several rods and levers, are provided.

Distribution of matrices into the magazine opened in the way just described, will proceed until a matrix belonging to another magazine, comes under the depressor, whereupon the above described automatic mechanism for completing the distribution into the then indicated magazine and for opening the one to which the said preceding matrix belongs, is set in motion.

It is to be understood that the present invention is not limited in respect of the construction of any of the mechanisms described, but that those constructions, or any of them, may be varied to any extent or be replaced by equivalents of any suitable type, provided that the respective functions are retained.

Having described my invention, what I claim and desire to secure by Letters Patent is:—

1. In a typographical composing machine, the combination with a relatively fixed assembler, a stationary chute delivering thereto, and containing means for inverting matrices passing therethrough, and a stationary column of magazines with their respective escapements, of an assembler entrance constructed to discharge the matrices into said chute at a common point, and escapement-actuating means together adjustable between the said chute and column to place any one of the magazines in delivering connection with the said assembler, and distributing mechanism including means for restoring the inverted matrices to their original position before they are returned to the selected magazine.

2. In a typographical composing machine, the combination with a relatively fixed assembler and a stationary column of magazines and their respective escapements, of a tubular stationary chute delivering into the said assembler and having means for inverting matrices passing therethrough and having as many ports in it as the column has magazines, and an assembler entrance constructed to discharge the matrices into said chute at a common point, and escapement-actuating means together adjustable between the said chute and column to place any of the magazines in delivering connection with the respective port in the said chute, and distributing mechanism including means for restoring the inverted matrices to their original position before they are returned to the selected magazine.

3. In a typographical composing machine, the combination with a relatively fixed assembler, a stationary chute delivering thereto, and containing means for inverting matrices passing therethrough, and a stationary column of oblique magazines with their respective escapements, of an assembler entrance having the same obliquity as the said magazines and constructed to discharge the matrices into said chute at a common point and escapement-actuating means together adjustable between the said chute and column, to place any one of the magazines in delivering connection with the said assembler, and distributing mechanism including means for restoring the inverted matrices to their original position before they are returned to the selected magazine.

4. In a typographical composing machine, the combination with a relatively fixed assembler, a stationary chute delivering thereto and containing means for inverting matrices passing therethrough, and a stationary column of magazines with their respective escapements, of an assembler entrance terminating in a chute to discharge the matrices into the stationary chute at a common point, and escapement-actuating means, the whole adjustable between the said stationary chute and column, to place any magazine in delivering connection with the said assembler, and distributing mechanism including means for restoring the inverted matrices to their original position before they are returned to the selected magazine.

5. In a typographical composing machine, the combination with a relatively fixed assembler, a stationary chute delivering thereto and containing manually operated means for inverting matrices passing therethrough, and a stationary column of magazines with their respective escapements, of an assembler entrance and escapement-actuating means together adjustable between the said chute and column to place any one of the magazines in delivering connection with the said assembler, and distributing mechanism including means for restoring the inverted matrices to their original position before they are returned to the selected magazine.

6. A font of matrices having one or more formative cavities for character in opposite edges, a toothed distributing notch in one end and a plain notch in the opposite end, a dovetail lug projecting from its front edge in a common position throughout the font and a magazine-indicating tooth in the plain notch of each matrix and in a common position, in combination with distributing mechanism including means to coöperate with said matrices.

7. An equipment of fonts of matrices having one or more formative cavities for character in opposite edges, a toothed distributing notch in one end and a plain notch in the opposite end, a dovetail lug projecting from the front edge of each matrix of the equipment in a common position throughout the latter, and a magazine indicating tooth in the plain notch of each matrix, in the same position throughout a font but in a different position in each font of the equipment, in combination with distributing mechanism including means to coöperate with said matrices.

8. In a typographical composing machine the combination with a plurality of magazines and matrices having formative cavities for character in opposite edges and projecting magazine indicating teeth, of a manual matrix-inverting device formed with a notch in its matrix engaging edge to make room for the said teeth at the moment of engagement with the said device, and distributing mechanism including means to restore the matrices inverted by said device to their original position before they have returned to their respective magazines.

9. In a typographical composing machine, the combination with a stationary column of oblique magazines having their respective escapements, a relatively fixed assembler, and a stationary chute delivering thereto, and containing means for inverting matrices passing therethrough, of an assembler entrance having the same obliquity as the magazines, escapement-actuating means and a delivery chute together adjustable between the column and stationary chute, a supporting frame carrying the escapement actuating means and the delivery chute and connected to the machine frame by a dovetail mortise and tenon device, a manual lever fulcrumed near the keyboard of the machine and linked to the said frame, and distributing mechanism including means for restoring the inverted matrices to their original position before they are returned to the selected magazine.

10. In a typographical composing machine, having a stationary column of magazines, a fixed assembler, and a stationary chute delivering thereto, and containing means for inverting matrices passing therethrough, the combination with assembler entrance and traveling belt with its pulley, together adjustable between the said column and chute, of a shaft in bearings on the machine frame, means for constantly rotating it, and a spline device connecting one of the said pulleys operatively to the said shaft to be driven thereby, together with distributing mechanism including means for restoring the inverted matrices to their original position before they are returned to the selected magazine.

11. In a typographical composing and distributing machine, the combination with means for composing a line of matrices in normal and inverted position and a movable organ for carrying said line, of a ridged bar adapted to receive the normal matrices of the composed line ready for distribution, a pivoted bar adapted to be rocked into position to receive the inverted matrices of the same line, and means actuated by the attainment by the said organ of its line-receiving position, adapted to rock the said pivoted bar into position for receiving the inverted matrices.

12. In a typographical composing and distributing machine, the combination of means for composing a line of matrices in normal and inverted position, a ridged bar and a grooved bar automatically held in position to receive respectively the normal and the inverted matrices of the composed line ready for distribution, and automatic means for turning the grooved bar about its axis far enough to separate the inverted matrices from the normal matrices.

13. In a typographical composing and distributing machine, the combination of a reciprocating line carrying organ. having two V-shaped bars depending therefrom, a pivoted grooved bar parallel with the said V-shaped bars, a pinion fast on the axis of the said pivoted bar, a rack engaged with the said pinion, and means including a cam actuated by the attainment by the said organ of its line-receiving position, for reciprocating the said rack and pinion.

14. In a typographical composing and distributing machine, the combination with a line-carrying organ having two bars adapted to carry matrices, the said bars being one behind the other, a distributer, means for making the said organ aline the front bar with the adjacent coöperating member of the distributer, and means for shifting the matrices off the said bar into that member, of means for moving the front bar out of alined position with the said member and the rear bar into that position, and means for making the shifting means thereupon repeat its shifting action.

15. In a typographical composing and distributing machine, the combination with a line-carrying organ having two bars adapted to carry matrices, the said bars being one behind the other, a distributer, of means for making the said organ aline the front bar with the adjacent coöperating member of the distributer, means comprising a knuckled link and a lever reciprocating the said link with a dwell between each reciprocation for shifting the matrices into the said member, a spring actuated cam bar and connections from it to the line carrying organ for moving the latter to locate the rear matrix carrying bar in or out of alining position with the said member, a spring actuated device to bend the knuckled link after the matrices have been shifted off the front matrix-carrying bar, and spring-actuated means to straighten the said link after the cam bar has alined the rear matrix-carrying bar with the said adjacent member.

16. In a typographical composing and distributing machine, the combination with a line-carrying organ having two bars adapted to carry matrices, the said bars being one behind the other, a distributer, means for making the said organ aline the front bar with the adjacent coöperating member of the distributer, of means comprising a knuckled link and a lever reciprocating the said link with a dwell between each reciprocation for shifting the matrices into the said member, a spring actuated cam bar and connections from it to the line carrying organ for moving the latter to locate the rear matrix carrying bar in or out of alining position with the said member, a spring-actuated device to bend the knuckled link after the matrices have been shifted off the front matrix-carrying bar, spring-actuated means to straighten the said link after the cam bar has alined the rear matrix-carrying bar with the said adjacent member, and means carried by the shifting means for returning the above-mentioned cam bar and link-bending means to their original positions and to lock them there.

17. In a typographical machine, the combination of a plurality of magazines, a distributer therefor, and selecting mechanism for connecting the distributer to one or another of the magazines, with a matrix formed with a projecting tooth to control the operation of the selecting mechanism.

18. In a typographical machine, the combination of a plurality of magazines, a distributer therefor, and selecting mechanism for connecting the distributer to one or another of the magazines, with a font of matrices each formed with a projecting tooth to control the operation of the selecting mechanism, the said teeth occupying the same position on the respective matrices throughout the font.

19. In a typographical machine, the combination of a plurality of magazines, a distributer therefor, and selecting mechanism for connecting the distributer to one or another of the magazines, with a matrix formed on its bottom edge with a projecting tooth to control the operation of said selecting mechanism.

20. In a typographical machine, the combination of a plurality of magazines, a distributer therefor, and selecting mechanism for connecting the distributer to one or another of the magazines, with a matrix formed in its bottom edge with a V-shaped notch and with a projecting tooth located in said notch to control the operation of the selecting mechanism.

21. In a typographical machine, the combination of a plurality of magazines, a distributer therefor, and selecting mechanism for connecting the distributer to one or another of the magazines, with a plurality of matrices of different fonts, each matrix being formed with a projecting tooth to control the operation of the selecting mechanism, and the said teeth being located in different relative positions on the matrices of the respective fonts.

22. In a typographical machine, the combination of a plurality of magazines, a distributer therefor, and selecting mechanism for connecting the distributer to one or another of the magazines, with a plurality of matrices of different fonts, each matrix being formed on its bottom edge with a projecting tooth to control the operation of the selecting mechanism, and the said teeth being located in different relative positions on the matrices of the respective fonts.

23. In a typographical machine, the combination of a plurality of magazines, a distributer therefor, and selecting mechanism for connecting the distributer to one or another of the magazines, with a plurality of matrices of different fonts, each matrix being provided in its bottom edge with a V-shaped notch and a projecting tooth located therein to control the operation of the selecting mechanism, the said projecting teeth being located in different relative positions in the notches of the matrices of the respective fonts, for the purpose described.

24. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a reversible matrix formed with a projecting lug adapted in the reversed position of the matrix to coöperate with said separating means and with a projecting tooth to control the operation of said selecting mechanism.

25. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a font of reversible matrices, each formed with a projecting lug adapted in the reversed position of the matrix to coöperate with said separating means and with a projecting tooth to control the operation of said selecting mechanism, the said projecting teeth being located in the same position on the respective matrices throughout the font.

26. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a reversible matrix formed on one of its vertical edges with a projecting lug adapted in the reversed position of the matrix to coöperate with said separating means and on its bottom edge with a projecting tooth to control the operation of said selecting mechanism.

27. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a reversible matrix formed on one of its vertical edges with a projecting lug adapted in the reversed position of the matrix to coöperate with said separating means, and also formed on its bottom edge with a V-shaped notch containing a projecting tooth to control the operation of said selecting mechanism.

28. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a plurality of reversible matrices of different fonts, each matrix being formed with a projecting lug adapted in the reversed position of the matrix to coöperate with said separating means and with a projecting tooth to control the operation of said selecting mechanism, the said projecting teeth being located in different relative positions in the matrices of the respective fonts.

29. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a plurality of reversible matrices of different fonts, each matrix being formed in one of its vertical edges with a projecting lug adapted in the reversed position of the matrix to coöperate with said separating means, and formed on its bottom edge with a projecting tooth to control the operation of said selecting mechanism, the said projecting teeth being located in different relative positions in the matrices of the respective fonts.

30. In a typographical machine capable of handling reversible matrices, the combination of a plurality of magazines, a distributer therefor, selecting mechanism for connecting the distributer with one or another of the magazines, and means for separating the reversed and unreversed matrices from each other prior to their delivery to the distributer, with a plurality of reversible matrices of different fonts, each matrix being formed on one of its vertical edges with a projecting lug adapted in the reversed position of the matrix to coöperate with said separating means and also formed in its bottom edge with a V-shaped notch containing a projecting tooth to control the operation of said selecting mechanism, the said projecting teeth being located in different relative positions in the notches of the matrices of the respective fonts.

31. In a typographical distributing machine having a plurality of magazines each equipped with a different font, of means by which the process of distribution is stopped by the presentation to the distributer, of a matrix of a different font from that of its immediate predecessor, means by which the then closed entrance to the magazine to which the presented matrix belongs, is opened, and means by which the said process is restarted.

32. In a typographical distributing machine, the combination with a fixed plurality of magazines, a distributer, and means for feeding the matrices to be distributed, one at a time thereto along a defined course, of a shutter for the entrance mouth of each magazine, means holding all the entrance mouths except one closed, there being a drop in the said course, a depressor above the drop, a set of blades below it adapted to stop the first matrix of a different font from its immediate predecessor, means for reciprocating the depressor to make it depress the said first matrix and the latter depress one of the set of blades, means by which the shutters held closed at the moment, are released, and means actuated by the depressed blade to open the shutter connected to that blade.

33. In a typographical distributing machine, the combination with a fixed plurality of magazines, a distributer, and means for feeding the matrices to be distributed, one at a time thereto along a defined course, of a shutter for the entrance mouth of each magazine, means holding all the entrance mouths except one closed, there being a drop in the said course, means for preventing the leading matrix dropping prematurely down the said drop, a depressor above the said drop, a set of blades below it adapted to stop the first matrix of a different font from its immediate predecessor, means for reciprocating the depressor to make it depress the said first matrix and the latter depress one of the set of blades, means by which the shutters held closed at the moment, are released, means actuated by the depressed blade to open the shutter connected to that blade, and means for closing the other shutters.

34. In a typographical distributing machine, the combination with a plurality of magazines, a distributer, and means for presenting the matrices to be distributed thereto one at a time, of a clutch disk, means by which the leading matrix being of a different font from its immediate predecessor, stops the presentation of matrices to the distributer, and means by which the stoppage of such matrix presentation, rotates the said clutch.

35. In a typographical distributing machine, the combination with a plurality of magazines, a distributer divided into two portions electrically insulated from each other and from the rest of the machine, and means for presenting the matrices to be distributed thereto, one at a time, of a clutch disk, an electric circuit including the said distributer and closed by the presence of a matrix upon the latter, and means for stopping the said disk at the end of each half of its rotation.

36. In a typographical distributing machine, the combination with a plurality of magazines, a distributer, and means for moving a matrix to be distributed toward the same of means for holding the entrances to all the magazines except one closed, means for holding the excepted magazine open, means for releasing the respective closing devices of all the magazines simultaneously, and means actuated by a matrix passing to the distributer to effect the opening of the respective magazine and the closing of all the other magazines.

37. In a typographical distributing machine the combination with a plurality of magazines, a distributer, and means for moving a matrix to be distributed toward the same, of a shutter pivoted across the entrance mouth of each magazine, a respective spring constantly tending to close the said shutter, a lever having one arm constantly engaged with the respective shutter so as to be affected by the closing action of its spring and the other arm pivotally connected with a rod, the said rod, a bar suspended above the said rods, a cam and opposed spring to lower the said bar into engagement with the particular rod temporarily holding its top in the path of the said rod, a set of lever-and-link connections between the path of the said matrix and the said rods, one of which connections is controlled through the medium of the said matrix as it is moved along the said path to leave the connected shutter free to be closed by its spring and to move the top of the connected rod into the path of the said bar in time for it to be engaged thereby for the purpose of holding the said shutter open.

38. In a typographical distributing machine, the combination with a plurality of magazines all of which except one have their entrance mouths constantly closed, a distributer serving that plurality and means for moving the matrices toward that distributer one by one, of means by which the leading matrix being of a different font from its immediate predecessor, stops its movement toward the distributer, a freely rotating clutch disk, means by which the stoppage just referred to clutches the said disk to a relatively constantly rotating member of the machine, means for stopping the disk at the end of its first and following half rotations, and means by which it controls the opening of one of the magazine entrances and the closure of all the others.

39. In a typographical machine, the combination of a composed line of matrices, a single distributer, and means for separating the matrices of the composed line edgewise in a lateral direction into separate series and delivering such series one after another to the distributer.

40. In a typographical machine, the combination of means for composing a line of matrices in reversed or unreversed position, and means for separating the reversed matrices edgewise in a lateral direction from the unreversed ones and restoring the former simultaneously to their normal position.

41. In a typographical machine, the combination of a composed line including reversed and unreversed matrices, a distributer, means for separating the reversed matrices edgewise in a lateral direction from the unreversed ones and restoring the former to their normal position, and means for delivering the two groups one after another to the distributer.

42. In a typographical machine, the combination of a composed line including reversed and unreversed matrices, a movable transporter for carrying the matrices from one position to another in the machine, and means controlled by the movement of said transporter for separating the reversed matrices edgewise in a lateral direction from the unreversed ones and restoring the former to their normal position.

43. In a typographical machine, the combination of a composed line of matrices, a distributer, a movable transporter for carrying the matrices to the distributer, means controlled by the movement of the transporter for separating the composed line of matrices laterally into separate groups, and means for shifting the transporter laterally to present such groups successively in operative relation to the distributer.

44. In a typographical machine, the combination of a movable transporter adapted to carry a plurality of groups of matrices, a distributer, and means for causing the transporter to present said groups one after another in operative relation to the distributer.

45. In a typographical machine, the combination of a distributer, a movable transporter for carrying a plurality of groups of matrices, means for causing said transporter to present such groups successively in operative relation to the distributer, and a single pusher for transferring the groups from the transporter to the distributer as they are successively presented thereto.

46. In a typographical machine comprising matrices of different forms, the combination of a plurality of magazines to contain the matrices and each having a series of channels therefor, a single distributer, means capable of directing the distributed matrices into the channels of but one magazine at a time, and automatic mechanism whereby the matrices from a given magazine will cause said means to direct them thereinto.

47. In a typographical machine comprising matrices of different forms, the combination of a plurality of magazines to contain the matrices and each having a series of channels therefor, a single distributer, a conductor leading from the distributer to all the magazines, a movable switch located in the conductor for deflecting matrices therefrom into one or another of the magazines and common to all the channels thereof, and mechanism controlled by the matrices for operating said switch.

48. In a typographical machine comprising matrices of different forms, the combination of a plurality of magazines to contain the matrices and each having a series of channels therefor, a single distributer, a conductor leading from the distributer to all the magazines, a series of matrix deflecting switches located in said conductor, one for each magazine and common to all the channels thereof, and mechanism controlled by the matrices from the respective magazines for operating the switches.

49. In a typographical machine comprising matrices of different forms, the combination of a plurality of magazines to contain the matrices and each having a series of channels therefor, a single distributer, a conductor leading from the distributer to all the magazines, a series of cover flaps, one for each magazine, extending entirely across its upper end so as to be common to all the channels thereof, and acting in their open position to deflect the matrices from the conductor into the corresponding magazines, and mechanism controlled by the matrices from the respective magazines for opening the corresponding flap and closing all the others.

50. In a typographical machine comprising matrices of different forms, the combination of a plurality of magazines, a single distributer, means for directing the distributed matrices into one or another of the magazines, and mechanism controlled by the matrices prior to their delivery to the distributer to govern the action of said means.

51. In a typographical machine comprising matrices of different forms, the combination of a plurality of magazines, a single distributer, means for directing the distributed matrices into one or another of the magazines, and mechanism controlled by the matrices prior to their delivery to the distributer to govern the action of said means, said mechanism permitting the delivery to the distributer of matrices of one form only at a time.

52. In a typographical machine comprising matrices of different forms, the combination of a plurality of magazines, a single distributer, means for directing the distributed matrices into one or another of the magazines, automatic mechanism actuated by a matrix of one form for causing said means to direct the distributed matrices into a corresponding magazine, and devices for preventing the actuation of said mechanism by a matrix of different form until the other matrices have been returned to their magazine.

53. In a typographical machine comprising matrices of different forms, the combination of a distributer, means for delivering the matrices thereto, and mechanism controlled by a matrix undergoing distribution for preventing the delivery to the distributer of a matrix of different form.

54. In a typographical machine comprising matrices of different forms, the combination of a distributer, means for delivering the matrices thereto, and mechanism for preventing the delivery to the distributer of matrices differing in form from those undergoing distribution, the said mechanism being rendered inactive automatically when the distribution of such matrices is completed.

55. In a typographical machine comprising matrices of different forms, the combination of a distributer, means for delivering the matrices thereto, mechanism allowing the delivery to the distributer of matrices of one form only at a time, and means for adjusting said mechanism automatically upon the distribution of such matrices for allowing the delivery to the distributer of matrices of a different form.

56. In a typographical machine comprising matrices of different forms, the combination of a plurality of magazines to contain the matrices, a single distributer, means for directing the distributed matrices into one or another of the magazines according to their form, and mechanism for allowing the delivery to the distributer only of matrices corresponding to the form contained in the operative magazine.

57. In a typographical machine comprising matrices of different forms, the combination of a plurality of magazines to contain said matrices, a single distributer, means controlled by the matrices for directing them into one or another of the magazines, and mechanism to prevent the delivery to the distributer of matrices of more than one form at a time.

58. In a typographical machine comprising matrices of different forms, the combination of a plurality of magazines, a single distributer therefor, a series of magazines selecting blades controlling the delivery of matrices to the distributer, means for varying the relative arrangement of the blades to permit the delivery to the distributer of matrices of one form or another, and means for restoring the blades to their normal positions after the distribution of such matrices is completed.

59. In a typographical machine comprising matrices of different forms, a distributer, mechanism to allow the delivery to the distributer of matrices of one form only at a time, and means for adjusting said mechanism automatically after such matrices have been distributed to permit the delivery to the distributer of matrices of another form.

60. In a typographical machine comprising matrices of different forms, the combination of a distributer, means for presenting the matrices thereto for distribution, mechanism to arrest the presentation of a matrix differing in form from one undergoing distribution, and means for rendering said arresting mechanism inactive, said means being controlled in their initial operation by the arrested matrix and in their final operation by the matrix undergoing distribution.

In witness whereof I have hereunto set my hand in the presence of two witnesses.

WILLIAM EBENEZER ELLIOTT.

Witnesses:
E. A. HARRIS,
H. WILLIAMS.